United States Patent
Lietzke et al.

(10) Patent No.: US 8,290,164 B2
(45) Date of Patent: Oct. 16, 2012

(54) AUTOMATIC RECOVERY OF TPM KEYS

(75) Inventors: Matthew P. Lietzke, Cary, NC (US); James P. Hoff, Wake Forest, NC (US); David Rivera, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1182 days.

(21) Appl. No.: 11/461,429

(22) Filed: Jul. 31, 2006

(65) Prior Publication Data
US 2008/0025513 A1    Jan. 31, 2008

(51) Int. Cl.
*H04L 9/00*      (2006.01)

(52) U.S. Cl. ........ 380/277; 380/278; 380/280; 380/284; 380/286; 380/44; 726/20; 726/5; 713/184; 713/165; 717/121

(58) Field of Classification Search .......... 380/270–279; 713/164–183, 184; 726/18–23, 26–27, 5; 717/121
See application file for complete search history.

(56) References Cited

U.S. PATENT DOCUMENTS

| | | |
|---|---|---|
| 5,241,597 A | 8/1993 | Bright |
| 6,118,874 A | 9/2000 | Okamoto et al. |
| 6,160,891 A | 12/2000 | Al-Salqan |
| 6,282,295 B1 | 8/2001 | Young et al. |
| 6,754,349 B1 | 6/2004 | Arthan |
| 6,845,160 B1 | 1/2005 | Aoki |
| 7,366,305 B2 * | 4/2008 | Brickell ............ 380/277 |
| 7,380,119 B2 * | 5/2008 | Bade et al. ............ 713/155 |
| 7,444,670 B2 * | 10/2008 | Berger et al. ............ 726/3 |
| 7,516,321 B2 * | 4/2009 | Chen et al. ............ 713/155 |
| 7,552,419 B2 * | 6/2009 | Zimmer et al. ............ 717/121 |
| 7,613,921 B2 * | 11/2009 | Scaralata ............ 713/167 |
| 7,624,283 B2 * | 11/2009 | Bade et al. ............ 713/189 |
| 7,711,960 B2 * | 5/2010 | Scarlata ............ 713/182 |
| 2002/0059286 A1 * | 5/2002 | Challener ............ 707/100 |
| 2003/0133575 A1 * | 7/2003 | Challener ............ 380/277 |
| 2003/0138105 A1 * | 7/2003 | Challener et al. ............ 380/277 |
| 2003/0182561 A1 * | 9/2003 | Challener et al. ............ 713/189 |
| 2003/0188179 A1 * | 10/2003 | Challener et al. ............ 713/193 |
| 2005/0058294 A1 * | 3/2005 | Chen et al. ............ 380/277 |

(Continued)

OTHER PUBLICATIONS

Klaus Kursawe, Improving End-User Security and Trustworthiness of TCG-Platforms, Sep. 29 2003, ACM, pp. 4-6.*

*Primary Examiner* — Nathan Flynn
*Assistant Examiner* — Viral Lakhia
(74) *Attorney, Agent, or Firm* — Ference & Associates LLC

(57) ABSTRACT

A trusted platform module (TPM) is a silicon chip that constitutes a secure encryption key-pair generator and key management device. A TPM provides a hardware-based root-of-trust contingent on the generation of the first key-pair that the device creates: the SRK (storage root key). Each SRK is unique, making each TPM unique, and an SRK is never exported from a TPM. Broadly contemplated herein is an arrangement for determining automatically whether a TPM has been replaced or cleared via loading a TPM blob into the TPM prior to the first time it is to be used (e.g. when a security-related software application runs). If the TPM blob loads successfully, then it can be concluded that the TPM is the same TPM that was used previously. If the TPM blob cannot be loaded, then corrective action will preferably take place automatically to configure the new TPM.

17 Claims, 1 Drawing Sheet

U.S. PATENT DOCUMENTS

| | | | |
|---|---|---|---|
| 2005/0081065 A1* | 4/2005 | Brickell et al. | 713/202 |
| 2005/0129244 A1* | 6/2005 | Catherman et al. | 380/277 |
| 2005/0132182 A1* | 6/2005 | Challener et al. | 713/150 |
| 2005/0138370 A1* | 6/2005 | Goud et al. | 713/164 |
| 2005/0138389 A1* | 6/2005 | Catherman et al. | 713/185 |
| 2005/0141717 A1* | 6/2005 | Cromer et al. | 380/277 |
| 2005/0144443 A1 | 6/2005 | Cromer et al. | |
| 2005/0149733 A1* | 7/2005 | Catherman et al. | 713/175 |
| 2005/0154890 A1* | 7/2005 | Vembu | 713/171 |
| 2005/0166051 A1* | 7/2005 | Buer | 713/173 |
| 2005/0187966 A1* | 8/2005 | Iino | 707/102 |
| 2005/0228994 A1 | 10/2005 | Kasai et al. | |
| 2005/0235141 A1* | 10/2005 | Ibrahim et al. | 713/164 |
| 2005/0257073 A1* | 11/2005 | Bade et al. | 713/193 |
| 2005/0289347 A1* | 12/2005 | Ovadia | 713/171 |
| 2006/0026422 A1* | 2/2006 | Bade et al. | 713/164 |
| 2006/0041932 A1 | 2/2006 | Cromer et al. | |
| 2006/0053302 A1* | 3/2006 | Yasaki et al. | 713/183 |
| 2006/0129824 A1* | 6/2006 | Hoff et al. | 713/176 |
| 2006/0230264 A1* | 10/2006 | Catherman et al. | 713/155 |
| 2006/0256108 A1* | 11/2006 | Scaralata | 345/418 |
| 2006/0259782 A1* | 11/2006 | Wang et al. | 713/189 |
| 2007/0014416 A1* | 1/2007 | Rivera et al. | 380/286 |
| 2008/0059799 A1* | 3/2008 | Scarlata | 713/176 |

* cited by examiner

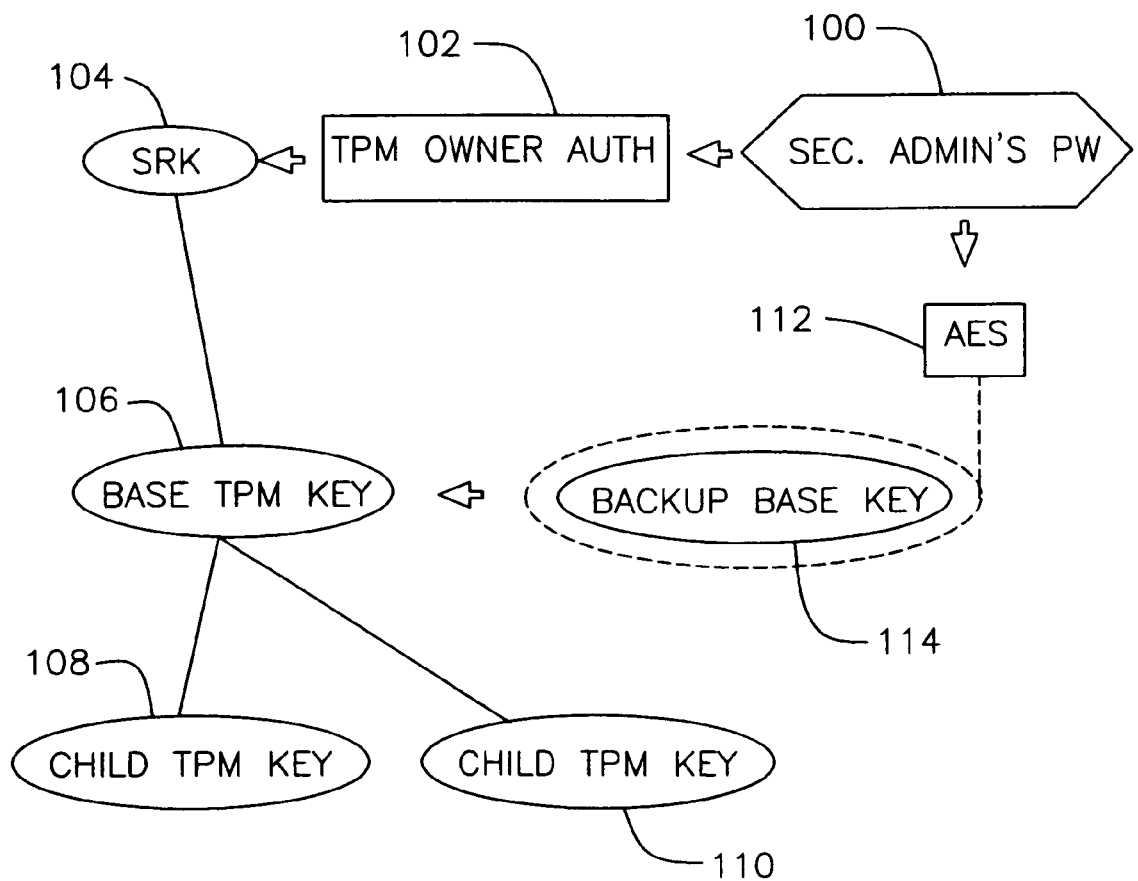

AUTOMATIC RECOVERY OF TPM KEYS

FIELD OF THE INVENTION

The present invention relates generally to trusted platform modules (TPMs) and configuring the same and/or replacements for the same.

BACKGROUND OF THE INVENTION

A trusted platform module (TPM) is a silicon chip that constitutes a secure encryption key-pair generator and key management device. A TPM provides a hardware-based root-of-trust contingent on the generation of the first key-pair that the device creates: the SRK (storage root key). Each SRK is unique, making each TPM unique, and an SRK is never exported from a TPM.

A major drawback that has been encountered in hardware-based roots-of-trust is that TPM devices can at times fail or be inadvertently cleared. Also, it has been increasingly common for a TPM to be integrated into other devices (such as a computer motherboard) that may itself fail and require replacement. Therefore, it is essential to be able to configure a replacement TPM and make existing security credentials usable again.

Typically, this is brought about via a series of manual steps: determining that a TPM has been replaced, generating an SRK on the new TPM, and importing all existing keys. Because this process does not take place automatically, it is subject to the vagaries of manual intervention and manipulation, with the result that there might not be an identical configuration to what existed originally.

In view of the foregoing, a need has accordingly been recognized in connection with effecting a process that avoids the pitfalls of the type of manual process just described.

SUMMARY OF THE INVENTION

In accordance with at least one presently preferred embodiment of the present invention, there is broadly contemplated herein an arrangement for determining whether a TPM has been replaced or cleared via loading a TPM blob into the TPM prior to the first time it is to be used (e.g. when a security-related software application runs). If the TPM blob loads successfully, then it can be concluded that the TPM is the same TPM that was used previously. If the TPM blob cannot be loaded, then corrective action will preferably take place automatically to configure the new TPM.

In summary, one aspect of the invention provides an apparatus comprising: an arrangement for generating a base key outside of a trusted platform module; an arrangement for importing the generated base key into a trusted platform module; said importing arrangement acting to produce a trusted platform module blob; an arrangement for ascertaining the usability of a trusted platform module in further operations via employing the trusted platform module blob.

Another aspect of the present invention provides a method comprising the steps of: generating a base key outside of a trusted platform module; importing the generated base key into a trusted platform module, producing a trusted platform module blob; ascertaining the usability of a trusted platform module in further operations via employing the trusted platform module blob.

Furthermore, an additional aspect of the invention provides a program storage device readable by machine, tangibly embodying a program of instructions executable by the machine to perform method steps, said method steps comprising: generating a base key outside of a trusted platform module; importing the generated base key into a trusted platform module, producing a trusted platform module blob; ascertaining the usability of a trusted platform module in further operations via employing the trusted platform module blob.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 is a schematic overview of a process according to the present invention.

DESCRIPTION OF THE PREFERRED EMBODIMENTS

Referring to FIG. 1, in accordance with a presently preferred embodiment of the present invention, before configuring a TPM for the first time, a software key-pair (or base key) 106 is generated outside of the TPM. This base key is encrypted with a symmetric key that is derived from a password 100 that the security administrator specifies. This encrypted base key is then stored to disk, and designated as the backup base key (114).

An owner-auth 102 is then specified to take ownership of the TPM. The owner-auth 102 is preferably derived from the same password (specified by the security administrator) 100 that was used to encrypt the base key 106. This process generates a unique SRK 104 for the TPM and prepares the TPM for use. The base key 106 that was generated previously is imported into the TPM, with the SRK 104 as its parent. As a result of importing the base key into the TPM, a TPM blob is returned and stored to disk. Other TPM keys (e.g., as indicated at 108 and 110) can be generated as "children" of this base key, and used for various practical applications.

Each time a security-related software application runs, the TPM blob of the stored base key 106 is preferably loaded into the TPM. The TPM blob preferably contains components that are specific to the SRK 104 that existed at the time the TPM blob was generated, and will not load into any TPM whose SRK is different than the SRK that existed at the time the TPM blob was generated. If the TPM blob loads successfully, then it can be concluded that the TPM being used is the same TPM that was used previously. If the TPM blob does not load into the TPM, then this means the TPM has been replaced, and an automatic process will preferably recover the previous TPM's configuration and allow the base key 106 (and its child keys 108/110) to load.

To configure the new TPM identically to the one that was used to generate the original base key blob, the security administrator will be prompted for the password (100) that was used to configure the original TPM. A key will be derived from this password that will decrypt (112) the stored backup base key 114 that was previously used. Then, a TPM owner-auth will be derived from that password, which will be used to take ownership of the new TPM and generate a new SRK. The decrypted software base key will be imported into the TPM, with the new SRK as its parent. A new base key TPM blob will be generated that is specific to this new SRK, and this new TPM blob will be stored to disk. As a result of this automatic process, the new TPM is now ready for service with the same owner-auth 102 that had been configured previously.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
   ascertaining usability of a trusted platform module implemented in hardware in a computing device via employing a first trusted platform module blob;
   responsive to an unsuccessful load of the first trusted platform module blob, determining that a trusted platform module is new; and
   responsive to said determining that a trusted platform module is new, automatically reconfiguring the trusted platform module to use one or more child keys produced for use with a previous trusted platform module, said automatically reconfiguring comprising:
   taking ownership of the trusted platform module;
   decrypting an encrypted base key used with said previous trusted platform module, the base key being stored at a location outside of the trusted platform module;
   generating a second storage root key unique to the trusted platform module;
   importing the base key into the trusted platform module; and
   generating a new trusted platform module blob specific to the second storage root key;
   wherein said second storage root key is a parent key of the base key such that one or more child keys usable with the previous trusted platform module are usable with the trusted platform module after reconfiguring.

2. The method according to claim 1, wherein the trusted platform module is one of new and cleared of previous configuration data.

3. The method according to claim 1, wherein said ascertaining usability of a trusted platform module comprises loading the first trusted platform module blob upon initiation of a further operation.

4. The method according to claim 1, wherein said ascertaining usability of a trusted platform module comprises loading the first trusted platform module blob upon initiation of a security-related software application run.

5. The method according to claim 1, wherein said ascertaining usability of a trusted platform module comprises indicating that the trusted platform module is the previous trusted platform module upon a successful load of the first trusted platform module blob.

6. The method according to claim 1, wherein said ascertaining usability of a trusted platform module comprises indicating that the trusted platform module is not the previous trusted platform module upon an unsuccessful load of the first trusted platform module blob.

7. The method according to claim 1, wherein the second storage root key is different from a storage root key used in the previous trusted platform module blob.

8. An apparatus comprising:
   a trusted platform module implemented in hardware;
   a first arrangement configured to ascertain usability of the trusted platform module via employing a first trusted platform module blob, said first arrangement being configured to:
   responsive to an unsuccessful load of the first trusted platform module blob, determine that the trusted platform module is new; and
   a second arrangement configured to automatically reconfigure the trusted platform module to use child keys produced for use with a previous trusted platform module, said second arrangement being configured to:
   take ownership of the trusted platform module;
   decrypt an encrypted base key used with said previous trusted platform module, the base key being stored at a location outside of the trusted platform module;
   generate a second storage root key unique to the trusted platform module;
   import the base key into the trusted platform module; and
   generate a new trusted platform module blob specific to the second storage root key;
   wherein said second storage root key is a parent key of the base key such that one or more child keys usable with the previous trusted platform module are usable with said trusted platform module after reconfiguring.

9. The apparatus according to claim 8, wherein said first arrangement acts to load the first trusted platform module blob upon initiation of a further operation.

10. The apparatus according to claim 8, wherein said first arrangement acts to load the first trusted platform module blob upon initiation of a security-related software application run.

11. The apparatus according to claim 8, wherein said first arrangement acts to indicate that the trusted platform module is the previous trusted platform module upon a successful load of the first trusted platform module blob.

12. The apparatus according to claim 8, wherein said first arrangement acts to indicate that the trusted platform module is not the previous trusted platform module upon an unsuccessful load of the first trusted platform module blob.

13. The apparatus according to claim 8, wherein the second storage root key is different from a storage root key used in the previous trusted platform module blob.

14. The apparatus according to claim 8, wherein the new trusted platform module is one of new and cleared of previous configuration data.

15. A non-signal program storage device readable by machine embodying a program of instructions executable by the machine to perform steps comprising:
   ascertaining usability of a trusted platform module implemented in hardware in a computing device via employing a first trusted platform module blob;
   responsive to an unsuccessful load of the first trusted platform module blob, determining that the trusted platform module is new; and
   responsive to said determining that the trusted platform module is new, automatically reconfiguring the trusted platform module to use one or more child keys produced for use with a previous trusted platform module, said automatically reconfiguring comprising:

taking ownership of the trusted platform module;

decrypting an encrypted base key used with said previous trusted platform module, the base key being stored at a location outside of the trusted platform module;

generating a second storage root key unique to the trusted platform module;

importing the base key into the trusted platform module; and generating a new trusted platform module blob specific to the second storage root key;

wherein said second storage root key is a parent key of the base key such that one or more child keys usable with the previous trusted platform module are usable with the trusted platform module after reconfiguring.

16. The non-signal program storage device according to claim 15, wherein the new trusted platform module is one of new and cleared of previous configuration data.

17. The non-signal program storage device according to claim 1, wherein the second storage root key is different from a storage root key used in the previous trusted platform module blob.

* * * * *